United States Patent
Lee et al.

(10) Patent No.: US 12,266,831 B2
(45) Date of Patent: Apr. 1, 2025

(54) START CONTROL SYSTEM AND METHOD OF FUEL CELL

(71) Applicants: HYUNDAI MOTOR COMPANY, Seoul (KR); KIA CORPORATION, Seoul (KR)

(72) Inventors: Jae Gwang Lee, Seoul (KR); Dae Jong Kim, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 827 days.

(21) Appl. No.: 17/242,965

(22) Filed: Apr. 28, 2021

(65) Prior Publication Data

US 2022/0093949 A1   Mar. 24, 2022

(30) Foreign Application Priority Data

Sep. 24, 2020   (KR) .......................... 10-2020-0124108

(51) Int. Cl.
*H01M 8/04302* (2016.01)
*H01M 8/04746* (2016.01)

(52) U.S. Cl.
CPC ... *H01M 8/04302* (2016.02); *H01M 8/04753* (2013.01); *H01M 2250/20* (2013.01)

(58) Field of Classification Search
CPC ......... H01M 8/04302; H01M 8/04753; H01M 8/04089; H01M 8/04179; H01M 8/04156; H01M 8/04201; H01M 8/04225; H01M 8/0444; H01M 8/04992; H01M 8/04231; H01M 8/0488; H01M 8/0491; B60L 58/31

See application file for complete search history.

(56) References Cited

U.S. PATENT DOCUMENTS

| | | | |
|---|---|---|---|
| 2015/0171446 A1* | 6/2015 | Lee .......................... | B60L 58/33 429/444 |
| 2016/0190620 A1* | 6/2016 | Kwon ............... | H01M 8/04388 429/444 |
| 2019/0288308 A1* | 9/2019 | Park ........................ | B60L 53/00 |

FOREIGN PATENT DOCUMENTS

KR   10-2017-0122366 A   11/2017

* cited by examiner

*Primary Examiner* — Stewart A Fraser
(74) *Attorney, Agent, or Firm* — Morgan, Lewis & Bockius LLP

(57) ABSTRACT

A start control system of a fuel cell includes: a fuel cell configured to generate power upon receiving air and fuel; an air supply system configured to supply air to a cathode of the fuel cell through an air supply line; a fuel supply system configured to supply fuel to an anode of the fuel cell through a fuel supply line that re-circulates fuel discharged from an outlet of the anode of the fuel cell to an inlet of the anode to supply fuel; an air controller configured to control the air supply system such that air flowing into the air supply line bypasses the cathode of the fuel cell when a start ON signal is input; and a fuel controller configured to supply new fuel to the fuel supply line and to control the fuel supply system to purge fuel of the fuel supply line.

15 Claims, 5 Drawing Sheets

FIG. 1 -PRIOR ART-

START CONTROL SYSTEM AND METHOD OF FUEL CELL

CROSS REFERENCE TO RELATED APPLICATION

The present application claims the benefit of priority to Korean Patent Application No. 10-2020-0124108, filed on Sep. 24, 2020 in the Korean Intellectual Property Office, the entire contents of which is incorporated herein for all purposes by this reference.

TECHNICAL FIELD

The present disclosure relates to a start control system and method of a fuel cell, and more particularly, to a sequence when restarting a fuel cell in a state where power generation is stopped.

BACKGROUND

A fuel cell, in which a cell that directly converts chemical energy generated by oxidation of fuel into electrical energy, is used as a power generation device. The fuel cell reacts like a chemical cell regarding the use of oxidation and reduction reactions, but unlike the chemical cell that performs a cell reaction inside a closed system, in the fuel cell, reactants are continuously supplied from outside and reaction products are continuously removed from the system. Recently, the fuel cell power generation system has been put into practical use, and since a reaction product of the fuel cell is pure water, research for use the fuel cell as an energy source for eco-friendly vehicles has been actively conducted.

A fuel cell system includes a fuel cell stack that generates electrical energy through a chemical reaction, an air supply device that supplies air to a cathode of the fuel cell stack, and a hydrogen supply device that supplies hydrogen to an anode of the fuel cell stack. That is, air containing oxygen is supplied to the cathode of the fuel cell stack and hydrogen is supplied to the anode of the fuel cell stack.

In the fuel cell, a hydrogen concentration in the anode is reduced due to crossover and a reaction of residual hydrogen and oxygen in a state where power generation is stopped. Accordingly, when the fuel cell is restarted, it is necessary to increase the hydrogen concentration of the anode, which was reduced while the power generation of the fuel cell was stopped. In particular, an optimal starting sequence is required to quickly secure the hydrogen concentration in the anode, while satisfying an emission regulation.

The contents described as the related art have been provided only to assist in understanding the background of the present disclosure and should not be considered as corresponding to the related art known to those having ordinary skill in the art.

SUMMARY

An object of the present disclosure is to provide a start control system and method of a fuel cell, capable of rapidly resuming power generation of a fuel cell, while satisfying an emission regulation.

According to an embodiment of the present disclosure, a start control system of a fuel cell includes: a fuel cell configured to generate power upon receiving air and fuel; an air supply system configured to supply air to a cathode of the fuel cell through an air supply line; a fuel supply system configured to supply fuel to an anode of the fuel cell through a fuel supply line that re-circulates fuel discharged from an outlet of the anode of the fuel cell to an inlet of the anode to supply fuel; an air controller configured to control the air supply system such that air flowing into the air supply line bypasses the cathode of the fuel cell when a start ON signal is input; and a fuel controller configured to supply new fuel to the fuel supply line when the start ON signal is input and to control the fuel supply system to purge fuel of the fuel supply line in a state where air of the air supply line bypasses the cathode of the fuel cell.

The air supply system may include an air compressor configured to supply air to the air supply line and a bypass line branched from the air supply line at an inlet of the cathode of the fuel cell and configured to join the air supply line at an outlet of the cathode by bypassing the fuel cell.

The air supply system may include a control valve located in the air supply line at an inlet or outlet of the cathode of the fuel cell and configured to control an amount of air flowing into the cathode of the fuel cell through the air supply line.

The air controller may control the control valve so that the amount of air flowing into the cathode of the fuel cell or an opening of the control valve gradually increases according to a preset rate of increase.

The air controller may further include: a power controller configured to control the air supply system so that air is supplied to the cathode of the fuel cell through the air supply line when a hydrogen concentration of the fuel cell line is equal to or greater than a preset concentration or when purge of the fuel supply line is completed and to control an output voltage of the fuel cell to a preset voltage or to control an output current of the fuel cell to be maintained below a preset current.

The fuel supply system may include a drain line branched from the fuel cell line at the outlet of the anode of the fuel cell and connected to an outlet of the cathode and a drain valve provided at the drain line, and the fuel controller may be configured to purge fuel of the fuel supply line to the air supply line by opening the drain valve.

The drain line may be connected to a water trap that collects moisture in the fuel supply line, and the fuel controller may be configured to control an opening time of the drain valve based on a water level of the water trap and a pressure of the water trap.

According to another embodiment of the present disclosure, a start control method of a fuel cell includes: receiving a start ON signal in a state where power generation of a fuel cell is stopped; controlling an air supply system such that air flowing into an air supply line bypasses a cathode of the fuel cell, while new fuel is supplied to a fuel supply line that supplies fuel to an anode of the fuel cell when the start ON signal is input; and controlling a fuel supply system such that fuel of the fuel supply line is purged in a state where air of the air supply line bypasses the cathode of the fuel cell.

The start control method may further include: controlling the air supply system to supply air to the cathode of the fuel cell through the air supply line when a hydrogen concentration of the fuel supply line is equal to or higher than a preset concentration or when purge of the fuel supply line is completed, after the controlling of the fuel supply system to purge fuel of the fuel supply line.

In the controlling of the air supply system to supply air to the cathode of the fuel cell, the hydrogen concentration of the fuel supply line may be estimated based on an amount of fuel supplied to the fuel supply line, an amount of fuel purged in the fuel supply line, and a crossover amount between the anode and the cathode.

In the controlling of the air supply system to supply air to the cathode of the fuel cell, a control valve located in the air supply line at an inlet or an outlet of the cathode of the fuel cell may be controlled so that an amount of air flowing into the cathode of the fuel cell or an opening of the control valve gradually increases according to a preset rate of increase.

The start control method may further include: controlling an output voltage of the fuel cell to a preset voltage or controlling an output current of the fuel cell to be maintained below a preset current, after the controlling of the air supply system to supply air to the cathode of the fuel cell.

The start control method may further include: connecting the fuel cell to a cathode oxygen depletion (COD) resistor to exhaust an output voltage after the receiving of the start ON signal; and connecting a relay mediating connection between an output terminal of the fuel cell and a consuming device that consumes generated power of the fuel cell.

In the controlling of the fuel supply system to purge the fuel of the fuel supply line, the fuel of the fuel supply line may be purged to the air supply line by opening a drain valve provided at a drain line connected from the fuel supply line to the air supply line.

In the controlling of the fuel supply system to purge the fuel in the fuel supply line, an opening time of the drain valve may be controlled based on a water level of a water trap that collects moisture of the fuel supply line and a pressure of the water trap.

DETAILED DESCRIPTION OF THE EMBODIMENTS

Figure 1:
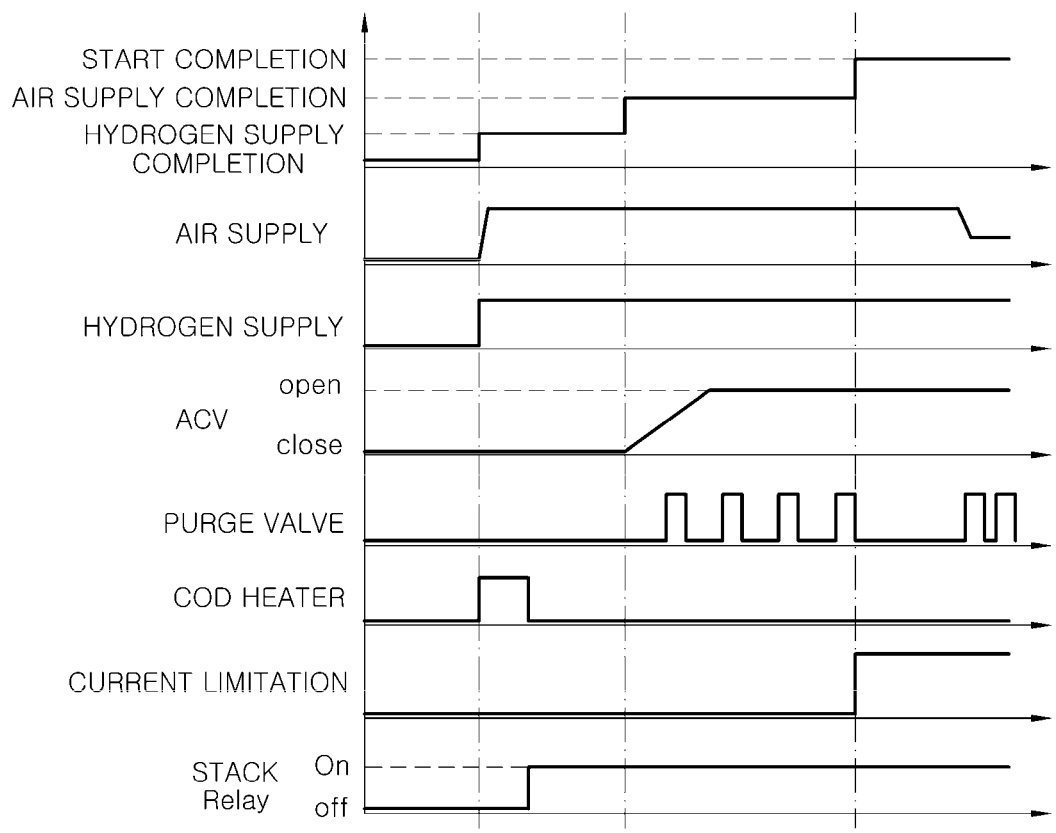
FIG. 1 illustrates a start control sequence of a fuel cell according to the related art.

Specific structural or functional descriptions of the embodiments of the present disclosure disclosed in the specification are exemplified for the purpose of describing the embodiments of the present disclosure only, and the embodiments of the present disclosure may be carried out in various forms and should not be construed to limit the embodiments described herein.

In the present disclosure, various modifications may be applied and various forms may be realized, and thus specific embodiments will be exemplified in the drawings and be described in detail in the specification. However, the present disclosure is not intended to specific disclosure forms, and it will be appreciated that the present disclosure includes all changes, equivalents, or replacements included in the spirit and technical range of the present disclosure.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element, without departing from the scope of the present disclosure.

When it is mentioned that a certain element is "connected to" or "electrically connected to" a second element, the first element may be directly connected or electrically connected to the second element, but it should be understood that a third element may intervene therebetween. On the other hand, when it is mentioned that a certain element is "directly connected to" or "directly electrically connected to" a second element, it should be understood that there is no third element therebetween. The other expressions for describing a relationship between constituent elements such as "between" and "directly between, or "adjacent to" and "directly adjacent to" are construed in the same way.

The terms used in the application are used to describe specific embodiments only and are not intended to limit the present disclosure. A singular expression includes a plural expression as long as they are clearly distinguished in the context. In the application, it should be understood that the terms such as "comprising", "including" are intended to express that features, numbers, steps, operations, constituent elements, part, or combinations thereof described in the specification are present and do not exclude existence or additions of one or more other features, numbers, steps, operations, constituent elements, part, or combinations thereof.

Unless defined in a different way, all the terms used herein including technical and scientific terms have the same meanings as understood by those skilled in the art to which the present disclosure pertains. Such terms as defined in generally used dictionaries should be construed to have the same meanings as those of the contexts of the related art, and unless clearly defined in the application, they should not be construed to have ideally or excessively formal meanings.

Hereinafter, embodiments of the present disclosure will be described in detail with reference to the accompanying drawings. The same constituent elements in the drawings are denoted by the same reference numerals.

FIG. 1 illustrates a start control sequence of a fuel cell according to the related art.

Referring to FIG. 1, when a start control signal of the fuel cell is input, hydrogen and air are supplied to the fuel cell.

Figure 2:
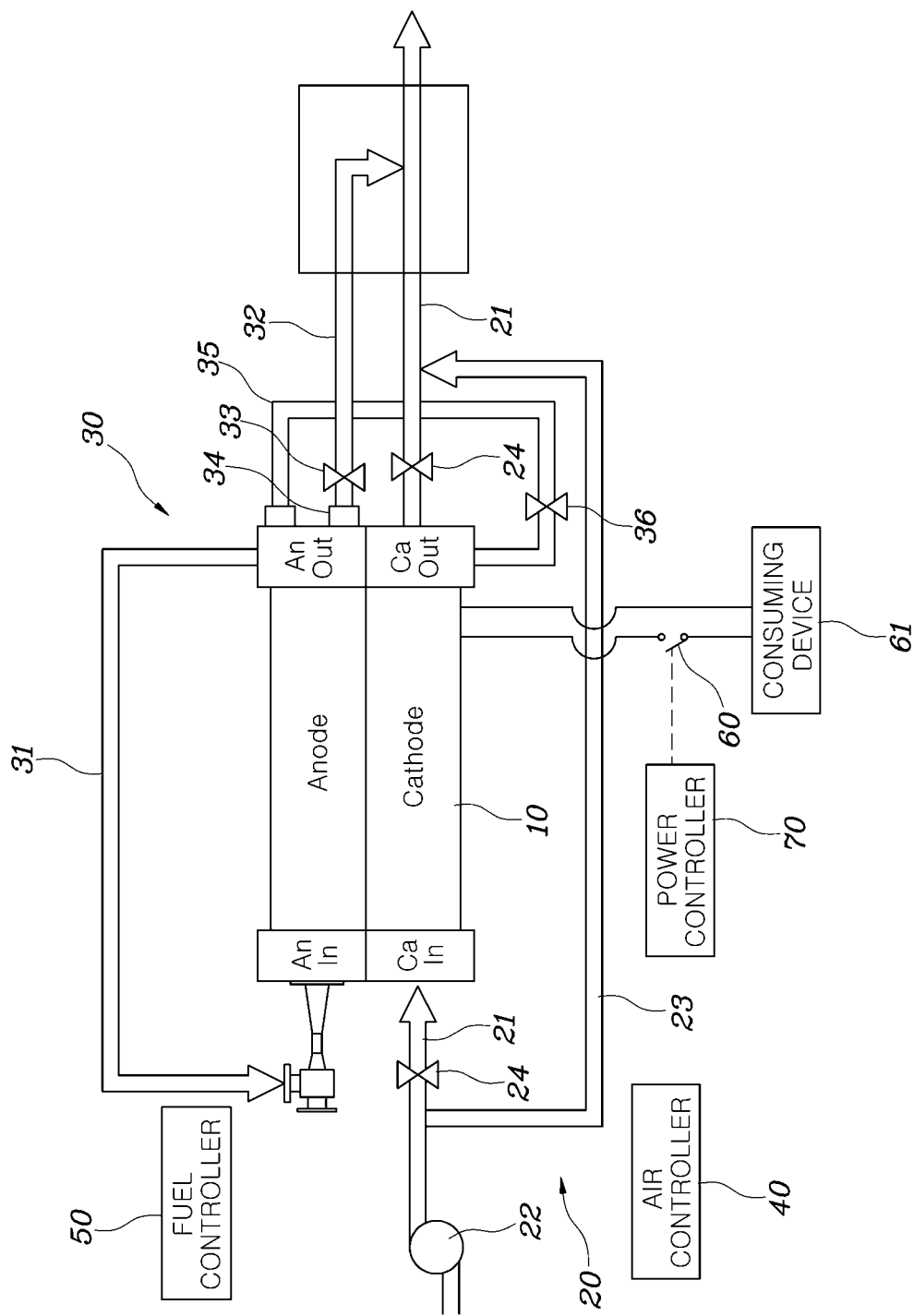
FIG. 2 illustrates a configuration of a start control system for a fuel cell according to an embodiment of the present disclosure.

In particular, by referring to FIG. 2 to merely help understanding the structure, in a state where a control valve 24 of an air supply line 21 that supplies air to a cathode of a fuel cell 10 is shut off, air is supplied to a bypass line 23 that bypasses the cathode of the fuel cell 10 to remove residual hydrogen in the air supply line 21.

Thereafter, hydrogen remaining in the cathode of the fuel cell 10 is discharged, while supplying air to the cathode of the fuel cell 10 through the air supply line 21 by opening the control valve 24, and thereafter, purge control of the fuel supply line 31 is performed.

However, according to the related art, since a concentration of hydrogen supplied to the anode of the fuel cell 10 through the fuel supply line 31 is not sufficiently secured, it takes an unnecessarily longer period of time to increase an output voltage of the fuel cell 10 even if air is supplied to the cathode of the fuel cell 10.

Figure 3:
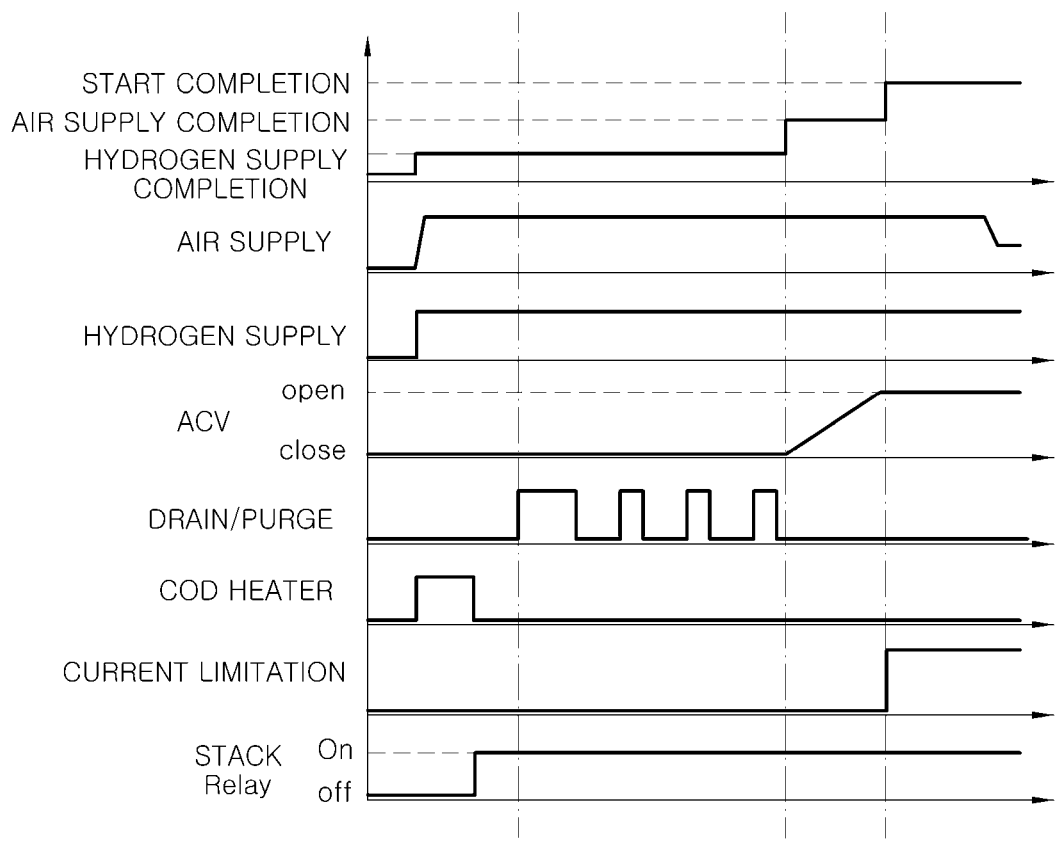
FIG. 3 illustrates a start control sequence of a fuel cell according to an embodiment of the present disclosure.

FIG. 2 is a configuration diagram of a start control system of the fuel cell 10 according to an embodiment of the present disclosure, and FIG. 3 is a start control sequence of the fuel cell 10 according to an embodiment of the present disclosure.

Referring to FIGS. 2 to 3, a start control system of a fuel cell according to an embodiment of the present disclosure includes a fuel cell 10 configured to generate power upon receiving air and fuel; an air supply system 20 configured to supply air to a cathode of the fuel cell 10 through an air supply line 21; a fuel supply system 30 configured to supply fuel to an anode of the fuel cell 10 through a fuel supply line 31 that re-circulates fuel discharged from an outlet of the anode of the fuel cell 10 to an inlet of the anode to supply the fuel; an air controller configured to control the air supply system 20 such that air flowing into the air supply line 21 bypasses the cathode of the fuel cell 10 when a start ON signal is input; and a fuel controller 50 configured to supply new fuel to the fuel supply line 31 when the start ON signal is input and to control the fuel supply system 30 to purge fuel of the fuel supply line 31 in a state where air of the air supply line 21 bypasses the cathode of the fuel cell 10.

The air controller 40, the fuel controller 50, and a power controller 70 according to an exemplary embodiment of the present disclosure may be implemented through an algorithm configured to control an operation of various components of a vehicle, a nonvolatile memory (not shown) configured to store data regarding a software command of reproducing the algorithm, and a processor (not shown) configured to perform an operation described below using the data stored in the corresponding memory. Here, the memory and the processor may be implemented as separate chips. Alternatively, the memory and the processor may be implemented as a single chip integrated with each other. The processor may take the form of one or more processors.

The fuel cell 10 may be a fuel cell 10 stack including a membrane-electrode assembly (MEA) therein. Electrical energy may be generated as oxygen and hydrogen in the air respectively supplied from the air supply system 20 and the fuel supply system 30 chemically react with each other in the fuel cell 10.

The air supply system 20 may be connected to the cathode of the fuel cell 10 to supply air to the inside of the fuel cell 10. In particular, the air supply system 20 may intake external air and supply the air to the fuel cell 10 and may discharge air discharged from the fuel cell 10 to the outside again.

The fuel supply line 31 may be connected to the anode of the fuel cell 10 to supply fuel to the inside of the fuel cell 10. In particular, the fuel supplied to the anode may be hydrogen. More specifically, the fuel supply system 30 may include a hydrogen tank in which hydrogen is stored, and the hydrogen stored in the hydrogen tank may be supplied to the fuel supply line 31 that recirculates a gas containing hydrogen discharged from the anode to the anode again.

The air controller 40 may control air to be supplied to the air supply line 21 immediately when a start ON signal is input. Air supply to the air supply line 21 may be controlled by driving an air compressor 22 or the like connected to the air supply line 21 to be described later. In particular, the air controller 40 may control air supply to bypass the cathode of the fuel cell 10, while discharging or diluting hydrogen remaining in the air supply line 21.

The fuel controller 50 may supply new fuel to the fuel supply line 31 so that fuel is circulated through the fuel supply line 31. In particular, the fuel controller 50 may control fuel supply by opening a hydrogen supply valve connected to a hydrogen tank. In an embodiment, the hydrogen tank may be connected to the fuel supply line 31 through an ejector, so that the hydrogen of the hydrogen tank may be supplied to the fuel supply line 31 and a gas containing hydrogen inside the fuel supply line 31 may be circulated.

At the same time, the fuel controller 50 may control the fuel supply system 30 to purge the fuel of the fuel supply line 31. In an embodiment, in purge control of the fuel supply system 30, a gas containing fuel from the fuel supply line 31 may be discharged to the air supply line 21. Accordingly, the hydrogen concentration in the recirculated fuel supply line 31 may be increased.

For the start control according to an embodiment of the present disclosure, when the start ON signal is input, a hydrogen concentration in the anode of the fuel cell 10 may be quickly secured, and at the same time, hydrogen is diluted in the air bypassing the cathode of the fuel cell 10, thus obtaining an effect of satisfying an emission regulation.

More specifically, the air supply system 20 may include an air compressor 22 supplying air to the air supply line 21 and a bypass line 23 branched from the air supply line 21 at an inlet of the cathode of the fuel cell 10 and joining the air supply line 21 at an outlet of the cathode by bypassing the fuel cell 10.

The air compressor 22 may be located at an inlet of the air supply line 21, intake external air, and supply the intaken air to the air supply line 21.

The bypass line 23 may be branched from the air supply line 21 and join the air supply line 21 again by bypassing the cathode of the fuel cell 10. That is, air flowing into the air supply line 21 may flow into the cathode of the fuel cell 10 or may be discharged to the outside by bypassing the fuel cell 10 through the bypass line 23.

The air supply system 20 may include a control valve 24 located in the air supply line 21 at the inlet or outlet of the cathode of the fuel cell 10 and controlling an amount of air flowing into the cathode of the fuel cell 10 through the air supply line 21.

In an embodiment, the control valve 24 may be a 2-way valve located at the inlet of the cathode of the fuel cell 10 at a downstream point compared to a point from which the bypass line 23 is branched or located at the outlet of the cathode of the fuel cell 10 at an upstream point compared to a point that the bypass line 23 joins. Air flowing into the air supply line 21 may flow into the cathode of the fuel cell 10 by opening the control valve 24.

In another embodiment, the control valve 24 may be a 3-way valve located at a point where the air supply line 21 and the bypass line 23 are branched or join.

The air controller 40 may control the control valve 24 such that the amount of air flowing into the cathode of the fuel cell 10 or an opening of the control valve 24 gradually increases according to a preset rate of increase.

In an embodiment, the air controller 40 may control the control valve 24 so that the amount of air flowing from the air supply line 21 to the cathode of the fuel cell 10 gradually increases according to a preset rate of increase.

In another embodiment, the air controller 40 may control the control valve 24 such that the opening of the control valve 24 gradually increases according to a preset rate of increase. The air controller 40 may control the opening of the control valve 24 to linearly increase at a constant rate over time as shown in FIG. 3.

The air controller 40 may further include the power controller 70, which controls the air supply system 20 to supply air to the cathode of the fuel cell 10 through the air supply line 21 when a hydrogen concentration of the fuel supply line 31 is equal to or higher than a preset concentration or when purging of the fuel supply line 31 is completed, controls an output voltage of the fuel cell 10 to a preset voltage, or controls an output current of the fuel cell 10 to be maintained at a level below a preset current.

The fuel controller 50 may determine that purging of the fuel supply line 31 is completed when the hydrogen concentration of the fuel supply line 31 is greater than or equal to a preset concentration. The air controller 40 may supply air to the cathode of the fuel cell 10 through the air supply line 21 after purging of the fuel supply line 31 is completed.

As air is supplied to the cathode of the fuel cell 10, power may be generated inside the fuel cell 10 by a chemical reaction between oxygen in the air and the fuel of the anode. The power controller 70 may control output power of the fuel cell 10.

Specifically, when the start ON signal is input, air is supplied to the air supply line 21, while hydrogen is supplied to the fuel supply line 31, and at the same time, the power controller 70 may connect the fuel cell 10 to a cathode oxygen depletion (COD) resistor to exhaust an output voltage.

When controlling of the COD for connecting the fuel cell 10 to the COD resistance is completed, the power controller 70 may connect a relay 60 mediating connection between an output terminal of the fuel cell 10 and a consuming device 61 that consumes generated power of the fuel cell 10.

Here, the consuming device 61, which is a device that consumes power generated by the fuel cell 10, may be a driving motor, auxiliary equipment, or a high voltage battery (in a charged state).

In particular, after the air starts to be supplied to the cathode of the fuel cell 10, the power controller 70 may control the output voltage of the fuel cell 10 to a preset voltage or control the output current of the fuel cell 10 to be maintained below a preset current.

Here, the preset voltage may be a voltage at which durability of the fuel cell 10 is not deteriorated as the output voltage of the fuel cell 10 increases in a light load output section of the fuel cell 10. For example, the preset voltage may be a voltage of about 0.8V of a unit cell voltage of the fuel cell 10 at which deterioration of durability is prevented.

In particular, the power controller 70 may increase the output voltage of the fuel cell 10 to follow the preset voltage and control the output voltage of the fuel cell 10 not to exceed the preset voltage.

In addition, the power controller 70 may control the output current of the fuel cell 10 to be maintained below a preset current. Specifically, the power controller 70 may limit the output current of the fuel cell 10 so that the output current of the fuel cell 10 is increased not to become the output voltage of the fuel cell 10.

In an embodiment, the preset current may be a current at which an output of the fuel cell 10 is maximized according to a performance curve I-V of the fuel cell 10. In a state where the output current of the fuel cell 10 is a preset current, the output voltage of the fuel cell 10 may be smaller than the preset voltage.

The fuel supply system 30 may include a drain line 32 branched from the fuel supply line 31 at the outlet of the anode of the fuel cell 10 and connected to the outlet of the cathode of the fuel cell 10 and a drain valve 33 provided at the drain line 32, and the fuel controller 50 may purge the fuel of the fuel supply line 31 to the air supply line 21 by opening the drain valve 33.

More specifically, the drain line 32 may be connected to a water trap 34 that collects moisture in the fuel supply line 31. The water trap 34 may be located downstream of the anode of the fuel cell 10 in the fuel supply line 31 and may collect moisture generated by power generation in the fuel cell 10 and transferred to the anode side. The drain line 32 may discharge moisture of the water trap 34 to the air supply line 21.

The fuel controller 50 may purge a gas containing fuel of the fuel supply line 31 to the air supply line 21 by opening the drain valve 33. When the drain valve 33 is opened, moisture collected by the water trap 34 may be initially discharged, and when the moisture discharge is completed, gas containing fuel may be discharged.

Figure 4:
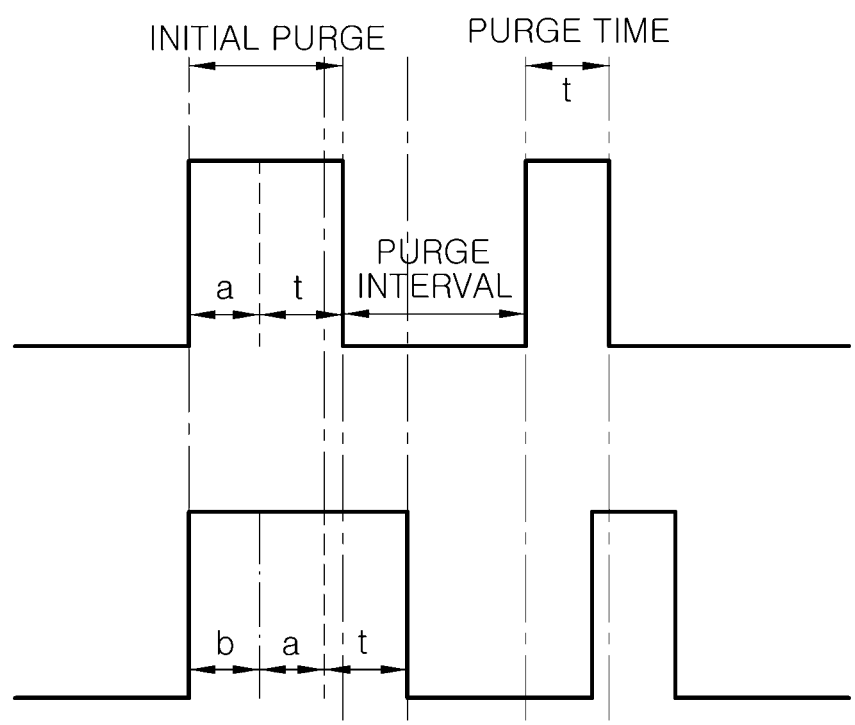
FIG. 4 illustrates purge control according to opening of a drain valve according to an embodiment of the present disclosure.

FIG. 4 shows purge control according to opening of the drain valve 33 according to an embodiment of the present disclosure.

Referring to FIG. 4, the fuel controller 50 may control an opening time of the drain valve 33 based on a water level of the water trap 34 and a pressure of the water trap 34.

Specifically, the water trap 34 may further include a water level sensor for sensing the amount of collected moisture, the fuel controller 50 may control an opening time of the drain valve 33 based on the water level of the water trap 34.

More specifically, the fuel controller 50 may control an initial purge time (a+t) based on a previously mapped control map when the water level of the water trap 34 is less than a preset minimum measurement value of the water level sensor.

Conversely, the fuel controller 50 may control an initial purge time (a+b+t) based on the water level sensed by the water level sensor and a preset control map when the water level of the water trap 34 is higher than or equal to a preset minimum measurement value of the water level sensor.

Specifically, the fuel controller 50 may predict a time at which moisture is discharged according to a water level sensed by the water level sensor and a differential pressure between a pressure of the water trap 34 and an atmospheric pressure.

The fuel controller 50 may control to remove moisture collected in the water trap 34 at first purging, and after the first purging, the fuel controller 50 may control with a preset purge time on the assumption that there is no newly generated moisture in the fuel cell 10.

A purge time and a purge interval may be previously set based on the amount of air supplied to the air supply line 21. The number of purge times may be set based on a hydrogen concentration in the fuel supply line 31. In particular, the fuel controller 50 may perform purging until the hydrogen concentration in the fuel supply line 31 is higher than or equal to a preset concentration.

In addition, the drain valve 33 may control an opening time of the drain valve 33 based on a pressure of the water trap 34. In particular, the drain valve 33 may estimate the amount of gas containing hydrogen discharged as the drain valve 33 is opened over time based on the differential pressure between the pressure of the water trap 34 and the atmospheric pressure, and control the opening time of the drain valve 33 based on the estimated amount of gas.

In another embodiment, a purge line 35 and a purge valve 36 may be further provided separately from the drain valve 33, and the fuel controller 50 may separately control the drain valve 33 and the purge valve 36.

The fuel controller 50 may estimate a hydrogen concentration of the fuel supply line 31 based on the amount of fuel supplied to the fuel supply line 31, the amount of fuel purged at the fuel supply line 31, and the amount of crossover between the anode and the cathode.

Specifically, the fuel controller 50 may estimate the amount of nitrogen (number of moles of nitrogen) and the amount of vapor (number of moles of vapor) when the fuel cell 10 is restarted using the hydrogen concentration of the fuel supply line 31 estimated at the start of the fuel cell 10, and monitor the hydrogen concentration of the fuel supply line 31 by reflecting the estimated amount of nitrogen and vapor, the amount of crossover of nitrogen and vapor, and the amount of purge of nitrogen and vapor.

In an embodiment, the hydrogen concentration of the fuel supply line 31 estimated at the start of the fuel cell 10 may be estimated through a map previously mapped according to a time during which power generation of the fuel cell 10 is stopped.

The hydrogen concentration of the fuel supply line 31 may be monitored using the amount of hydrogen calculated by subtracting the amount of nitrogen and the amount of vapor from the total amount of gas of the fuel supply line 31.

The total amount of gas ($n_{An}$) of the fuel supply line 31 may be estimated using a gas pressure (P), volume (V) and temperature (T) of the fuel supply line 31 from an ideal gas state equation as shown in the following equation.

$$n_{An} = (P_{An} \cdot V_{An})/RT \, [\text{mol}]$$

Here, R is a gas constant, 8.314 [J/molK].

A gas diffusion rate may be inversely proportional to a thickness of an electrolyte membrane of the fuel cell 10 stack and may be proportional to a gas partial pressure difference between the anode side and the cathode side. Specifically, a crossover gas amount may be calculated by applying FICK's LAW (diffusion law) as follows.

$$\frac{\dot{m}}{A} = -D\frac{\partial c}{\partial x} = -D\frac{M}{RT}\frac{\partial P}{\partial x}$$

Here, $\dot{m}$ in is a mass diffusion rate (g/s) of a gas, A is a diffusion area, D is a gas diffusion coefficient, x is a diffusion distance, c is a gas concentration, R is a universal gas constant (8.314 J/mol), P is a gas pressure, T is a gas temperature, and M is a molar mass (g/mol) of the gas. This may be summarized as follows.

$$\dot{m} = -D\frac{M}{RT}\frac{\partial P}{\partial x}A = \dot{n} \cdot M$$

$$\dot{n} = -D\frac{1}{RT}\frac{\partial P}{\partial x}A$$

Here, $\dot{n}$ is a gas diffusion rate (mol/s).

That is, the amount of gas cross-over between the electrolyte membrane of the fuel cell 10 may be calculated by the following equation.

$$n_{n2\_x0} = \frac{D_{N2}}{RT}\frac{P_{Ca,N2} - P_{An,N2}}{\delta}A$$

Here, $n_{n2\_x0}$ is a diffusion rate of nitrogen, P is pressure, [kPa], R is gas constant, 8.314 [J/mol/K], T is temperature, [K], D is diffusion coefficient, A is area of electrolyte membrane, δ is thickness of electrolyte membrane, $P_{Ca,N2}$ is partial pressure of nitrogen on the cathode side of the fuel cell 10, and $P_{An,N2}$ is partial pressure of nitrogen on the anode side of the fuel cell 10.

$$n_{V\_x0} = \frac{D_V}{RT}\frac{P_{Ca,V} - P_{An,V}}{\delta}A$$

Here, $n_{V\_x0}$ is diffusion rate of vapor, P is pressure, [kPa], R is gas constant, 8.314 [J/mol/K], T is temperature, [K], D is diffusion coefficient, A is area of electrolyte membrane, δ is thickness of electrolyte membrane, $P_{Ca,V}$ is partial pressure of vapor on the cathode side of the fuel cells 10, and $P_{An,V}$ is partial pressure of vapor on the anode side of the fuel cell 10.

On the contrary, hydrogen may cross over from the anode side of the fuel cell 10 to the cathode side.

$$n_{H2\_x0} = \frac{D_{H2}}{RT}\frac{P_{An,H2} - P_{Ca,H2}}{\delta}A$$

Here, $n_{H2\_x0}$ is diffusion rate of hydrogen, P is pressure, [kPa], R is gas constant, 8.314 [J/mol/K], T is temperature, [K], D is diffusion coefficient, A is area of electrolyte membrane, δ is thickness of electrolyte membrane, $P_{An,H2}$ is hydrogen partial pressure on anode side, and $P_{Ca,H2}$ is hydrogen partial pressure on the cathode side.

In addition, the gas diffusion rate may be proportional to the gas diffusion coefficient, and the gas diffusion coefficient may be varied according to a moisture content and temperature of the electrolyte membrane located between the anode side and the cathode side of the fuel cell 10.

The gas diffusion coefficient D may be a fixed constant value, but in order to further increase accuracy, the gas diffusion coefficient D may be a value which varies according to conditions such as the degree of deterioration and temperature of the fuel cells 10. More specifically, the gas diffusion coefficient D may be calculated using a value that varies depending on the moisture content and temperature of the electrolyte membrane located between the anode side and the cathode side of the fuel cell 10. In addition, the gas diffusion coefficient D may be calculated to vary as the electrolyte membrane of the fuel cell 10 deteriorates.

The gas purge rate ($n_{purge}$) may be proportional to a pressure difference between the gas pressure ($P_{An}$) on the anode side and an external gas pressure ($P_{out}$). The external gas pressure ($P_{out}$) may be a gas pressure on the cathode side. A specific equation may be as follows.

$$n_{purge} = f(P_{wt} - P_{amb}) = C(P_{wt} - P_{amb})$$

Here, $P_{wt}$ is a pressure of the water trap 34, $P_{amb}$ is atmospheric pressure, and C is a purge gain value determined according to a purge period, an opening of the drain valve 33 and an opening time of the drain valve 33 at the time of purge.

Specifically, a purge rate for each gas may be calculated by the following equation (nitrogen purge rate ($n_{N2\_purge}$), vapor purge rate ($n_{V\_purge}$), hydrogen purge rate ($n_{H2\_purge}$).

$$n_{N2\_purge} = n_{purge} \cdot \frac{n_{N2}}{n_{An}}$$

$$n_{V\_purge} = n_{purge} \cdot \frac{n_V}{n_{An}}$$

$$n_{H2\_purge} = n_{purge} \cdot \frac{n_{N2}}{n_{An}}$$

An initial amount of nitrogen and an initial amount of vapor of the fuel supply line 31 may be separately predicted, the amounts of nitrogen and vapor cross-over on the anode side and the amounts of nitrogen and vapor purged on the anode side are separately calculated, and a current amount of nitrogen of the fuel supply line 31 may be calculated based on the amount of crossover nitrogen and the amount of purged nitrogen, and a current amount of vapor of the fuel supply line 31 may be calculated based on the predicted initial vapor amount, the amount of crossover nitrogen, and the amount of purged vapor.

That is, the current amount of nitrogen and the current amount of vapor may be calculated by integrating the diffusion rate and the purge rate per unit time to the initial amount over time using the above equation.

The current amount of hydrogen may be calculated by subtracting the current amount of nitrogen and the current amount of vapor from the amount of gas in the fuel supply line 31.

Therefore, hydrogen concentration of the fuel supply line 31 may be monitored by calculating all of the amount of gas, the current amount of nitrogen, the current amount of vapor, and the current amount of hydrogen of the fuel supply line 31 on the assumption that a gas concentration of the fuel supply line 31 is uniform.

Accordingly, it is possible to continuously monitor the hydrogen concentration by calculating the hydrogen concentration, which is difficult to estimate due to a reaction with oxygen, through the amount of nitrogen and the amount of vapor.

In addition, when there is no change in the water level according to a critical time after opening the drain valve 33, the hydrogen concentration may be estimated by adding the critical time.

The fuel controller 50 may set the number of purges by comparing the estimated hydrogen concentration of the fuel supply line 31 with a preset concentration. Here, the preset concentration may be set to, for example, about 60%.

Figure 5:
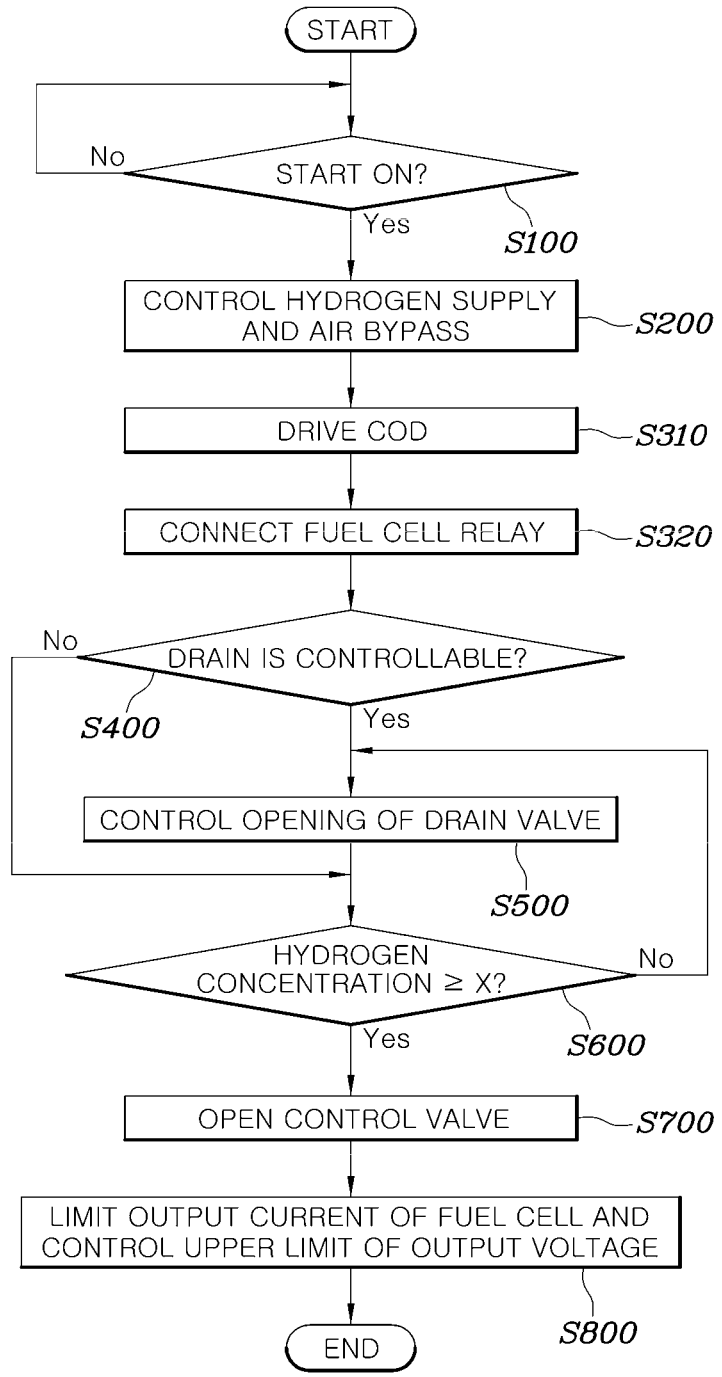
FIG. 5 is a flowchart of a start control method of a fuel cell according to an embodiment of the present disclosure.

FIG. 5 is a flowchart of a start control method of the fuel cell 10 according to an embodiment of the present disclosure.

Referring further to FIG. 5, the start control method of the fuel cell 10 according to an embodiment of the present disclosure includes a step (S100) of receiving a start ON signal in a state where power generation of the fuel cell 10 is stopped; a step (S200) of controlling the air supply system 20 such that air flowing into the air supply line 21 bypasses the cathode of the fuel cell 10, while new fuel is supplied to the fuel supply line 31 that supplies fuel to the anode of the fuel cell 10 when the start ON signal is input; and a step (S500) of controlling the fuel supply system 30 such that fuel of the fuel supply line 31 is purged in a state where air of the air supply line 21 bypasses the cathode of the fuel cell 10.

In the step (S100) of receiving the start ON signal, a start ignition signal may be input from an electronic control unit (ECU).

The start control method may further include a step (S700) of controlling the air supply system 20 to supply air to the cathode of the fuel cell 10 through the air supply line 21 when a hydrogen concentration of the fuel supply line 31 is equal to or higher than a preset concentration or when purge of the fuel supply line 31 is completed (S600), after the controlling of the fuel supply system 30 to purge fuel of the fuel supply line 31 (S500).

In the step (S700) of controlling the air supply system 20 to supply air to the cathode of the fuel cell 10, the hydrogen concentration of the fuel supply line 31 may be estimated based on an amount of fuel supplied to the fuel supply line 31, an amount of fuel purged in the fuel supply line 31, and a crossover amount between the anode and the cathode.

In the step (S700) of controlling the air supply system 20 to supply air to the cathode of the fuel cell 10, the control valve 24 located in the air supply line 21 at the inlet or the outlet of the cathode of the fuel cell 10 may be controlled so that an amount of air flowing into the cathode of the fuel cell 10 or an opening of the control valve 24 gradually increases according to a preset rate of increase.

The start control method of the fuel cell 10 may further include a step (S800) of controlling an output voltage of the fuel cell 10 to a preset voltage or controlling an output current of the fuel cell 10 to be maintained below a preset current, after the step (S700) of controlling of the air supply system 20 to supply air to the cathode of the fuel cell.

The start control method of the fuel cell 10 may further include a step (S310) of connecting the fuel cell 10 to a cathode oxygen depletion (COD) resistor to exhaust an output voltage after the receiving of the start ON signal (S100), and a step (S320) of connecting a relay mediating connection between an output terminal of the fuel cell 10 and a consuming device 61 that consumes generated power of the fuel cell 10.

In the step (S500) of controlling of the fuel supply system 30 to purge the fuel of the fuel supply line 31, the fuel of the fuel supply line 31 may be purged to the air supply line 21 by opening the drain valve 33 provided at the drain line 32 connected from the fuel supply line 31 to the air supply line 21.

The start control method of the fuel cell 10 may further include a step (S400) of determining whether it is possible to control the drain of the fuel supply line 31 before the step (S500) of controlling the fuel supply system 30 to purge the fuel of the fuel supply line 31.

In the step (S400) of determining whether it is possible to control the drain of the fuel supply line 31, it may be determined whether it is below a temperature (0° C.) at which moisture is frozen, and if the temperature is below the temperature at which moisture is frozen, it may be determined that it is not possible to control the drain if a water level of the water trap 34 is lower than or equal to a preset water level (e.g., 5 mm) when the start was previously turned off.

In addition, a slope of the vehicle may be received, and when the slope of the vehicle is equal to or greater than a preset slope, it is determined that moisture stored in the water trap 34 is frozen and the drain valve 33 is shut off, so that it is not possible to control the drain.

In the step (S500) of controlling the fuel supply system 30 to purge the fuel of the fuel supply line 31, an opening time of the drain valve 33 may be controlled based on a water level of the water trap 34 that collects moisture in the fuel supply line 31 and a pressure of the water trap 34.

According to the start control system and method of a fuel cell of the present disclosure, when a start ON signal is input, a hydrogen concentration is quickly secured at the anode of the fuel cell.

In addition, as the hydrogen purged in the air bypassing the cathode of the fuel cell is diluted, the emission regulation may be satisfied.

In addition, by estimating the hydrogen concentration in the fuel supply line and performing purge control at the beginning of the start-up, unnecessary discharge of hydrogen is prevented, thereby improving fuel efficiency.

Although the present disclosure has been shown and described with respect to specific embodiments, it will be apparent to those having ordinary skill in the art that the present disclosure may be variously modified and altered without departing from the spirit and scope of the present disclosure as defined by the following claims.

What is claimed is:

1. A start control system of a fuel cell, the start control system comprising:
   the fuel cell configured to generate power upon receiving air and fuel;
   an air supply system configured to supply the air to a cathode of the fuel cell through an air supply line;
   a fuel supply system configured to supply the fuel to an anode of the fuel cell through a fuel supply line;
   an air controller configured to control the air supply system such that the air flowing into the air supply line bypasses the cathode of the fuel cell when a start ON signal is input; and
   a fuel controller configured to supply a new fuel to the fuel supply line when the start ON signal is input and to control the fuel supply system to purge fuel of the fuel supply line in a state where the air of the air supply line bypasses the cathode of the fuel cell.

2. The start control system of claim 1, wherein the air supply system includes:
   an air compressor configured to supply the air to the air supply line; and
   a bypass line branched from the air supply line at an inlet of the cathode of the fuel cell and configured to join the air supply line at an outlet of the cathode by bypassing the fuel cell.

3. The start control system of claim 1, wherein the air supply system includes a control valve disposed in the air supply line at an inlet or an outlet of the cathode of the fuel cell and configured to control an amount of the air flowing into the cathode of the fuel cell through the air supply line.

4. The start control system of claim 3, wherein the air controller controls the control valve so that the amount of the air flowing into the cathode of the fuel cell or an opening of the control valve gradually increases according to a preset rate of increase.

5. The start control system of claim 1, wherein
   the air controller further includes a power controller configured to control the air supply system so that the air is supplied to the cathode of the fuel cell through the air supply line when a hydrogen concentration of the fuel cell line is equal to or greater than a preset concentration or when purge of the fuel supply line is completed and to control an output voltage of the fuel cell to a preset voltage or to control an output current of the fuel cell to be maintained below a preset current.

6. The start control system of claim 1, wherein the fuel supply system includes a drain line branched from the fuel cell line at an outlet of the anode of the fuel cell and connected to an outlet of the cathode and a drain valve provided at the drain line, and
   wherein the fuel controller is configured to purge fuel of the fuel supply line to the air supply line by opening the drain valve.

7. The start control system of claim 6, wherein the drain line is connected to a water trap that collects moisture in the fuel supply line, and
   wherein the fuel controller is configured to control an opening time of the drain valve based on a water level of the water trap and a pressure of the water trap.

8. A start control method of a fuel cell, the start control method comprising:
   receiving a start ON signal in a state where power generation of the fuel cell is stopped;
   controlling an air supply system such that air flowing into an air supply line bypasses a cathode of the fuel cell, while new fuel is supplied to a fuel supply line that supplies fuel to an anode of the fuel cell in response to receiving the start ON signal; and
   controlling a fuel supply system such that fuel of the fuel supply line is purged in a state where the air of the air supply line bypasses the cathode of the fuel cell.

9. The start control method of claim 8, further comprising, after the controlling of the fuel supply system to purge the fuel of the fuel supply line, controlling the air supply system to supply the air to the cathode of the fuel cell through the air supply line when a hydrogen concentration of the fuel supply line is equal to or higher than a preset concentration or when purge of the fuel supply line is completed.

10. The start control method of claim 9, wherein the controlling of the air supply system to supply the air to the cathode of the fuel cell includes estimating the hydrogen concentration of the fuel supply line based on an amount of fuel supplied to the fuel supply line, an amount of fuel purged in the fuel supply line, and a crossover amount between the anode and the cathode.

11. The start control method of claim 9, wherein the controlling of the air supply system to supply the air to the cathode of the fuel cell includes controlling a control valve disposed in the air supply line at an inlet or an outlet of the cathode of the fuel cell so that an amount of air flowing into the cathode of the fuel cell or an opening of the control valve gradually increases according to a preset rate of increase.

12. The start control method of claim 9, further comprising, after the controlling of the air supply system to supply the air to the cathode of the fuel cell, controlling an output voltage of the fuel cell to a preset voltage or controlling an output current of the fuel cell to be maintained below a preset current.

13. The start control method of claim 8, further comprising:
   after the receiving of the start ON signal, connecting the fuel cell to a cathode oxygen depletion (COD) resistor to exhaust an output voltage; and
   connecting a relay mediating connection between an output terminal of the fuel cell and a consuming device that consumes generated power of the fuel cell.

14. The start control method of claim 8, wherein the controlling of the fuel supply system to purge the fuel of the fuel supply line includes purging fuel of the fuel supply line to the air supply line by opening a drain valve provided at a drain line connected from the fuel supply line to the air supply line.

15. The start control method of claim 14, wherein the controlling of the fuel supply system to purge the fuel in the fuel supply line includes controlling an opening time of the drain valve based on a water level of a water trap that collects moisture of the fuel supply line and a pressure of the water trap.

* * * * *